United States Patent
Ibrahim et al.

(10) Patent No.: US 8,271,783 B2
(45) Date of Patent: Sep. 18, 2012

(54) SUBORDINATE TRUSTED PLATFORM MODULE

(75) Inventors: Wael M. Ibrahim, Cypress, TX (US); Manuel Novoa, Cypress, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2997 days.

(21) Appl. No.: 10/827,218

(22) Filed: Apr. 19, 2004

(65) Prior Publication Data

US 2005/0235141 A1    Oct. 20, 2005

(51) Int. Cl.
*H04L 29/06* (2006.01)

(52) U.S. Cl. ......................... 713/164; 713/166

(58) Field of Classification Search ............... 713/166, 713/164, 171
See application file for complete search history.

(56) References Cited

U.S. PATENT DOCUMENTS

| | | | |
|---|---|---|---|
| 7,159,240 B2 * | 1/2007 | England et al. ............... 726/6 |
| 7,191,464 B2 * | 3/2007 | Cromer et al. ............... 726/2 |
| 7,281,010 B2 * | 10/2007 | Challener ................. 707/100 |
| 2003/0105965 A1 * | 6/2003 | Challener ................. 713/184 |
| 2005/0138423 A1 * | 6/2005 | Ranganathan ............ 713/201 |

* cited by examiner

*Primary Examiner* — Mohammad W Reza

(57) ABSTRACT

Systems, methodologies, media, and other embodiments associated with cryptographic key maintenance and/or migration are described. One exemplary system embodiment includes a logic for performing cryptographic key maintenance and/or migration and an interface for operably connecting the system to a trusted platform.

22 Claims, 14 Drawing Sheets

SUBORDINATE TRUSTED PLATFORM MODULE

BACKGROUND

A Trusted Platform Module (TPM), as described by the Trusted Computing Platform Alliance (TCPA), now known as the Trusted Computing Group (TCG), is a hardware component that facilitates hardening security in a platform. An example TPM provides, among other things, four major functionalities. These functionalities may include, for example, asymmetric key functions for on-chip key pair generation, secure storage of hash values representing platform configuration information that facilitates verifiable attestation, endorsement key functions, and true random number generation.

Example functionalities, the TCG, and example TPMs are more fully described in documents like those available at www.trustedcomputinggroup.org and in TCG specifications (e.g., version 1.1b). Hardened security embedded in trusted computing platforms produces issues related to balancing security, openness, and usability. Similarly, issues concerning maintenance and/or migration arise due to tradeoffs between security and platform failure recovery processing associated with TPMs. While it is desirable to be able perform TCG migration (e.g., attach TPM migratable key data structures to other protected storage trees) and/or TCG maintenance (e.g., cloning a broken trusted platform with the cooperation of the platform manufacturer and platform owner), migration and maintenance may conventionally compromise security.

One primary TPM function is to provide a theoretically unlimited amount of protected storage by protecting encryption keys via an RSA 2048 bit storage key generated within the TPM. This key is not to be exposed outside the TPM. Protecting external keys by an internally held key may be referred to as "wrapping". A TPM may wrap keys in a key hierarchy using a non-migratable storage root key (SRK) designed to reside exclusively within the TPM. TCG rules for non-migratable keys include not allowing a non-migratable key out of a TPM and binding, on a one-to-one basis, a non-migratable key to a trusted platform. These rules facilitate enhancing the TCG notion of "trust" being related to a third party platform's ability to query a TCG enabled trusted platform and assess whether the trusted platform is trustworthy for a given set of operations and/or transactions.

Thus, keys and/or secrets may be encrypted by a TPM but not be stored in a TPM. They may be stored in various storage media (e.g., hard drive) available on a platform, leading to a theoretically unlimited amount of protected data for storing keys and/or secrets. A TPM may store the SRK in a read-only non-volatile memory (NVM). A TPM may also store data (e.g., flags) that indicate whether a wrapped key and/or secret is migratable or non-migratable. Thus, a TPM may perform many security related functions for a platform.

However, a TPM and/or a trusted platform to which a TPM is bound may malfunction, break, or experience other problems. For example, in early TCG platforms, a TPM may be implemented as a daughter board that is uniquely bound to the trusted platform. If the daughter board fails, or is perceived to have failed (e.g., board is jiggled out of place, even momentarily), then the TPM will be seen to have failed. While the TCG specification describes theories for providing maintenance and migration processes to mitigate issues associated with a TPM and/or platform malfunctioning, it does not provide an implementation.

BRIEF DESCRIPTION OF THE DRAWINGS

The accompanying drawings, which are incorporated in and constitute a part of the specification, illustrate various example systems, methods, and so on that illustrate various example embodiments of aspects of the invention. It will be appreciated that the illustrated element boundaries (e.g., boxes, groups of boxes, or other shapes) in the figures represent one example of the boundaries. One of ordinary skill in the art will appreciate that one element may be designed as multiple elements or that multiple elements may be designed as one element. An element shown as an internal component of another element may be implemented as an external component and vice versa. Furthermore, elements may not be drawn to scale.

DETAILED DESCRIPTION

Figure 1:
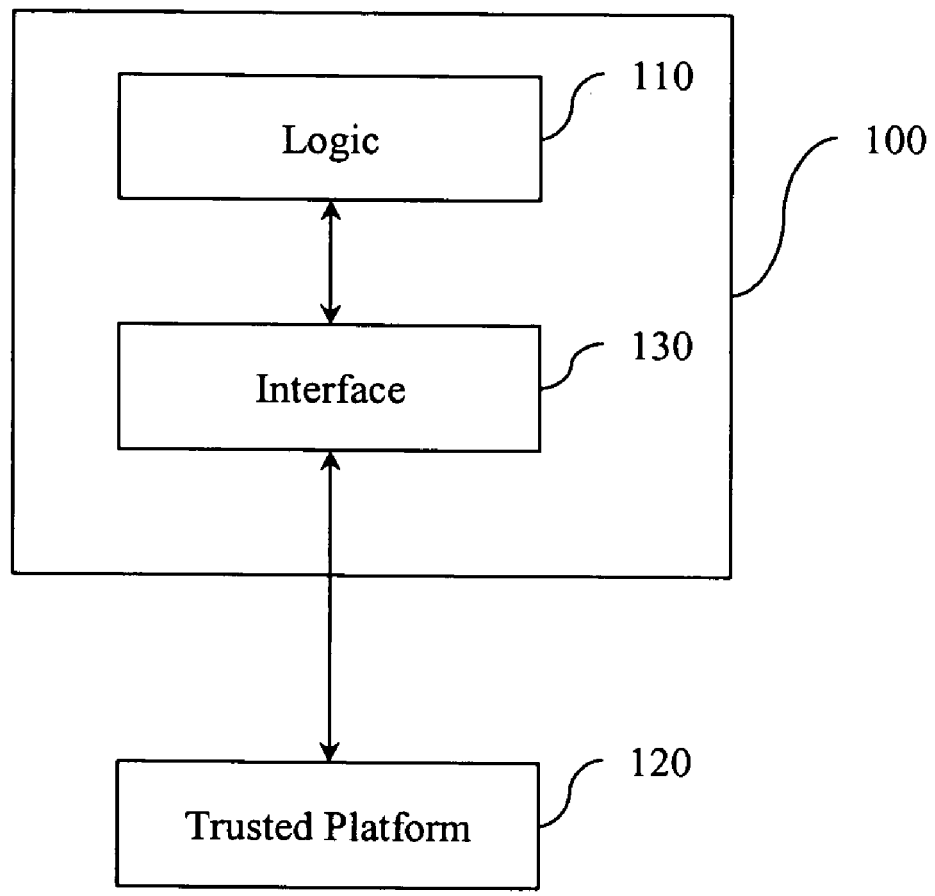
FIG. 1 illustrates an example subordinate trusted platform module (STPM).

Given that a TPM may fail, example systems and methods described herein provide a cryptographic key and/or secret maintenance and/or migration solution that provides flexibility in mitigating risks associated with TPM failure. In one example, a subordinate trusted platform module (STPM) acts as a strong token, as a pure intermediate storage mechanism, that facilitates substantially instantaneous restoration of a regular TPM and/or substantially instantaneous re-enabling of an otherwise unusable key hierarchy. Thus, in one example, an STPM is a separate logic that is detachably, operably connectable to a trusted platform, and that facilitates cryptographic key maintenance and/or migration by being configured to perform a subset of the set of functions performable by a TPM associated with the trusted platform. For example, an STPM may decrypt keys and/or secrets that were encrypted by a TPM but cannot create new keys, perform attestation services, be used as an authentication device, and so on. In one example, the cryptographic key maintenance and/or migration functionalities comply with the TCG specification version 1.1b.

The following includes definitions of selected terms employed herein. The definitions include various examples and/or forms of components that fall within the scope of a term and that may be used for implementation. The examples are not intended to be limiting. Both singular and plural forms of terms may be within the definitions.

"Computer-readable medium", as used herein, refers to a medium that participates in directly or indirectly providing signals, instructions and/or data. A computer-readable medium may take forms, including, but not limited to, non-volatile media, volatile media, and transmission media. Non-volatile media may include, for example, optical or magnetic disks and so on. Volatile media may include, for example, optical or magnetic disks, dynamic memory and the like. Transmission media may include coaxial cables, copper wire, fiber optic cables, and the like. Transmission media can also take the form of electromagnetic radiation, like that generated during radio-wave and infra-red data communications, or take the form of one or more groups of signals. Common forms of a computer-readable medium include, but are not limited to, a floppy disk, a flexible disk, a hard disk, a magnetic tape, other magnetic medium, a CD-ROM, other optical medium, punch cards, paper tape, other physical medium with patterns of holes, a RAM, a ROM, an EPROM, a FLASH-EPROM, or other memory chip or card, a memory stick, a carrier wave/pulse, and other media from which a computer, a processor or other electronic device can read. Signals used to propagate instructions or other software over a network, like the Internet, can be considered a "computer-readable medium."

"Logic", as used herein, includes but is not limited to hardware, firmware, software and/or combinations of each to perform a function(s) or an action(s), and/or to cause a function or action from another logic, method, and/or system. For example, based on a desired application or needs, logic may include a software controlled microprocessor, discrete logic like an application specific integrated circuit (ASIC), a programmed logic device, a memory device containing instructions, or the like. Logic may include one or more gates, combinations of gates, or other circuit components. Logic may also be fully embodied as software. Where multiple logical logics are described, it may be possible to incorporate the multiple logical logics into one physical logic. Similarly, where a single logical logic is described, it may be possible to distribute that single logical logic between multiple physical logics.

An "operable connection", or a connection by which entities are "operably connected", is one in which signals, physical communications, and/or logical communications may be sent and/or received. Typically, an operable connection includes a physical interface, an electrical interface, and/or a data interface, but it is to be noted that an operable connection may include differing combinations of these or other types of connections sufficient to allow operable control. For example, two entities can be operably connected by being able to communicate signals to each other directly or through one or more intermediate entities like a processor, operating system, a logic, software, or other entity. Logical and/or physical communication channels can be used to create an operable connection.

"Platform", as used herein, refers to a set of communicating, co-operating computer hardware components and/or logics arranged into a physical device like a personal computer, a server, a mainframe, and the like. A platform may include computer hardware, may have executable instructions and/or data stored in firmware associated with the platform and may have executable instructions and/or data stored in software associated with the platform. A "trusted platform", is a platform that includes a trusted platform module, as that term is defined by the TCG.

"Signal", as used herein, includes but is not limited to one or more electrical or optical signals, analog or digital signals, data, one or more computer or processor instructions, messages, a bit or bit stream, or other means that can be received, transmitted and/or detected.

"Software", as used herein, includes but is not limited to, one or more computer or processor instructions that can be read, interpreted, compiled, and/or executed and that cause a computer, processor, or other electronic device to perform functions, actions and/or behave in a desired manner. The instructions may be embodied in various forms like routines, algorithms, modules, methods, threads, and/or programs including separate applications or code from dynamically and/or statically linked libraries. Software may also be implemented in a variety of executable and/or loadable forms including, but not limited to, a stand-alone program, a function call (local and/or remote), a servelet, an applet, instructions stored in a memory, part of an operating system or other types of executable instructions. It will be appreciated by one of ordinary skill in the art that the form of software may be dependent on, for example, requirements of a desired application, the environment in which it runs, and/or the desires of a designer/programmer or the like. It will also be appreciated that computer-readable and/or executable instructions can be located in one logic and/or distributed between two or more communicating, co-operating, and/or parallel processing logics and thus can be loaded and/or executed in serial, parallel, massively parallel and other manners.

Suitable software for implementing the various components of the example systems and methods described herein include programming languages and tools like Java, Pascal, C#, C++, C, CGI, Perl, SQL, APIs, SDKs, assembly, firmware, microcode, and/or other languages and tools. Software, whether an entire system or a component of a system, may be embodied as an article of manufacture and maintained or provided as part of a computer-readable medium as defined previously. Another form of the software may include signals that transmit program code of the software to a recipient over a network or other communication medium. Thus, in one example, a computer-readable medium has a form of signals that represent the software/firmware as it is downloaded from a web server to a user. In another example, the computer-readable medium has a form of the software/firmware as it is maintained on the web server. Other forms may also be used.

"User", as used herein, includes but is not limited to one or more persons, software, computers or other devices, or combinations of these.

Some portions of the detailed descriptions that follow are presented in terms of algorithms and symbolic representations of operations on data bits within a memory. These algorithmic descriptions and representations are the means used by those skilled in the art to convey the substance of their work to others. An algorithm is here, and generally, conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic and the like.

It has proven convenient at times, principally for reasons of common usage, to refer to these signals as bits, values, elements, symbols, characters, terms, numbers, or the like. It should be borne in mind, however, that these and similar terms are to be associated with the appropriate physical quantities and are merely convenient labels applied to these quantities. Unless specifically stated otherwise, it is appreciated that throughout the description, terms like processing, computing, calculating, determining, displaying, or the like, refer to actions and processes of a computer system, logic, processor, or similar electronic device that manipulates and transforms data represented as physical (electronic) quantities.

FIG. 1 illustrates an example subordinate trusted platform module (STPM) 100. The STPM 100 includes a logic 110 that may be configured to perform cryptographic key maintenance and/or cryptographic key migration for a trusted platform 120. The STPM 100 and the trusted platform 120 may be bound together in a one-to-one manner to facilitate securely performing the cryptographic key maintenance and/or migration. The STPM 100 may also include an interface 130 configured to facilitate operably connecting the STPM 100 to the trusted platform 120.

The STPM 100 may be embodied, for example, as an ASIC (application specific integrated software), a microprocessor operably connected to non-volatile random access memory (NVRAM), hardware, software, firmware, combinations thereof, and so on. In one example, the STPM 100 may be embodied as a printed circuit card manufactured into a USB token. In one example, the STPM 100 may be an auxiliary and/or subordinate TPM that does not reside on the trusted platform 120 with the primary TPM but is accessible to the trusted platform 120 via, for example, a common bus and/or interface to the trusted platform. The common bus and/or interface may be, for example, a USB (Universal Serial Bus) interface, a SCSI (Small Computer Systems Interface) interface, a PCI (peripheral component interconnect) interface, an ISA (Industrial Standard Architecture) interface, an EISA (Extended ISA) interface, and the like. Thus, the interface 130 may be configured to facilitate operably connecting the system to the trusted platform 120 by interfaces including, but not limited to, a Universal Serial Bus, a Small Computer Systems Interface, a Peripheral Component Interconnect, an Industrial Standard Architecture, an Extended Industrial Standard Architecture, a microchannel, and wireless connections (e.g., IEEE 802.15.1, 802.15.4).

The logic 110 may perform cryptographic key maintenance and/or migration. Cryptographic key maintenance may include, for example, cloning the trusted platform 120 with the cooperation of a manufacturer of the trusted platform 120 and an owner of the trusted platform 120. Additionally, and/or alternatively, cryptographic key maintenance may include having the manufacturer of the trusted platform 120 act as an intermediary and migrating a non-migratable storage root key from a root of a key storage hierarchy associated with a trusted platform module associated with the trusted platform 120. Cryptographic key migration may include, for example, logically attaching a TPM migratable key data structure from one protected storage tree to another protected storage tree. In one example, the cryptographic key maintenance and the cryptographic key migration performed by the logic 110 comply with the Trusted Computing Group (TCG) specification version 1.1b. While version 1.1b is provided as an example, it will be appreciated that example systems and methods described herein may function with other TCG specifications that support, as a minimum compatibility, a version 1.1b functionality.

The logic 110 may store various items that support performing cryptographic key maintenance and/or migration. For example, the logic 110 may store items including, but not limited to, a copy of a storage root key, a binding data that facilitates binding the logic 110 to the trusted platform 120 in a one-to-one binding, a processor executable set of instructions that facilitate the trusted platform 120 and/or the logic 110 determining that the trusted platform 120 is interfacing with the logic 110 and not a trusted platform module (not illustrated) that was supporting the trusted platform 120, and so on. Similarly, the logic 110 may store a processor readable set of data that facilitates the trusted platform 120 and/or the logic 110 determining that the trusted platform 120 is interfacing with the logic 110 instead of a trusted platform module that was supporting the trusted platform 120.

These example items facilitate the STPM 100 unwrapping keys that were wrapped by the TPM to which the STPM 100 was bound. While four example items are provided, it is to be appreciated that a greater and/or lesser number of items may be stored. Thus, the STPM 100 may not be simply a channel to transfer data but a system that can decrypt files, keys, secrets, and so on that were encrypted by the bound TPM. Therefore, the STPM 100 may be used in scenarios including, but not limited to, where a TPM fails but the trusted platform 120 and data associated with the TPM are intact, where the trusted platform 120 user/owner desires substantially immediate access to data protected by a failed TPM, where a systems administrator (sysadmin) or information technology (IT) support staff does not have a replacement trusted platform available, and the like. In one example, the logic 110 is configured to facilitate substantially instantaneously restoring a trusted platform module. This may be accomplished by, for example, inserting an SRK stored in the STPM 100 at the root of a key hierarchy that would be otherwise inaccessible in the trusted platform 120. In another module, the logic 110 is configured to decrypt items like a key, and a piece of data encrypted by a trusted platform module.

An example STPM 100 facilitates decrypting data from migratable keys without a primary TPM, is immune to file corruption, and is a tamper resistant trusted device. While the STPM 100 facilitates decrypting items encrypted by the primary TPM, the STPM 100 may also be configured to not disclose secrets to other software running on the trusted platform 120 associated with the primary TPM. Thus, an example STPM 100 may execute its own code and access its own data but block the running of external code, which protects the STPM 100 from software attacks against a platform. Therefore, in one example, the logic 110 is configured to execute processor executable instructions associated with the logic 110 while preventing execution of processor executable instructions not associated with the logic 110. Similarly, the logic 110 may be configured to read processor readable data associated with the logic 110 while preventing a second logic from reading the processor readable data associated with the logic 110.

An example STPM 100 may be bound, in a one-to-one manner to a TPM and/or a trusted platform 120. Binding the STPM 100 may require a trusted platform 120 owner and manufacturer to produce an OEAP (Optimal Asymmetric Encryption Padding) encoded blob (binary large object) pursuant to a TCG specification (e.g., specification version 1.1b). Then, if a user requests, the STPM 100 that was bound to the TPM can be used to do maintenance and/or migration for the TPM. The STPM 100 may back up some data (e.g., SRK) from the TPM. In one example, the backed up data is immune to accidental deletion and can be used a pre-determined, finite number of times (e.g., 1) in maintenance and/or migration processing related to the TPM to which it was bound.

A logic on the trusted platform 120 may be configured to interact with the STPM 100 and to establish the initial binding between the TPM and the STPM 100. Once the TPM and STPM 100 are bound, the STPM 100 can selectively facilitate maintenance and/or migration processing related to the SRK.

After an STPM 100 has been used for maintenance operations, the STPM 100 may be erased, disabled, "self-destruct" or otherwise make its copy of the SRK unavailable. With the one-to-one binding in place, the logic 110 can be configured to detect whether there is a functional trusted platform module associated with the trusted platform 120 and to only perform certain operations based on the status of the TPM. For example, if the STPM 100 detects a functioning TPM, then the STPM 100 may only allow binding operations, and not allow recovery operations. Similarly, if the STPM 100 detects that there is no functioning TPM then the STPM 100 may allow maintenance, migration, and/or restore operations after verifying a one-to-one binding with the trusted platform 120.

An example STPM 100 may not be a complete TPM. For example, the STPM 100 may be configured to not generate additional secrets in the maintenance hierarchy with which it is working (e.g., encrypting, protecting). Similarly, the example STPM 100 may be configured to not act as an authentication device for a platform. Thus, in one example, the logic 110 may be configured to prevent creation of a new cryptographic key by the STPM 100, to prevent performance of an attestation service by the STPM 100, and to prevent performance of an authentication service by the STPM 100.

In general, primary TPMs reside on an LPC (Low Pin Count) bus to facilitate access to early bootstrap processes. However, STPM 100 will likely reside on a bus or interface (e.g., USB, 1394, Ethernet) that does not have similar access to early bootstrap processes. Therefore, the STPM 100 may not be able to help assure a trust chain like a TPM located on an LPC bus.

Figure 2:
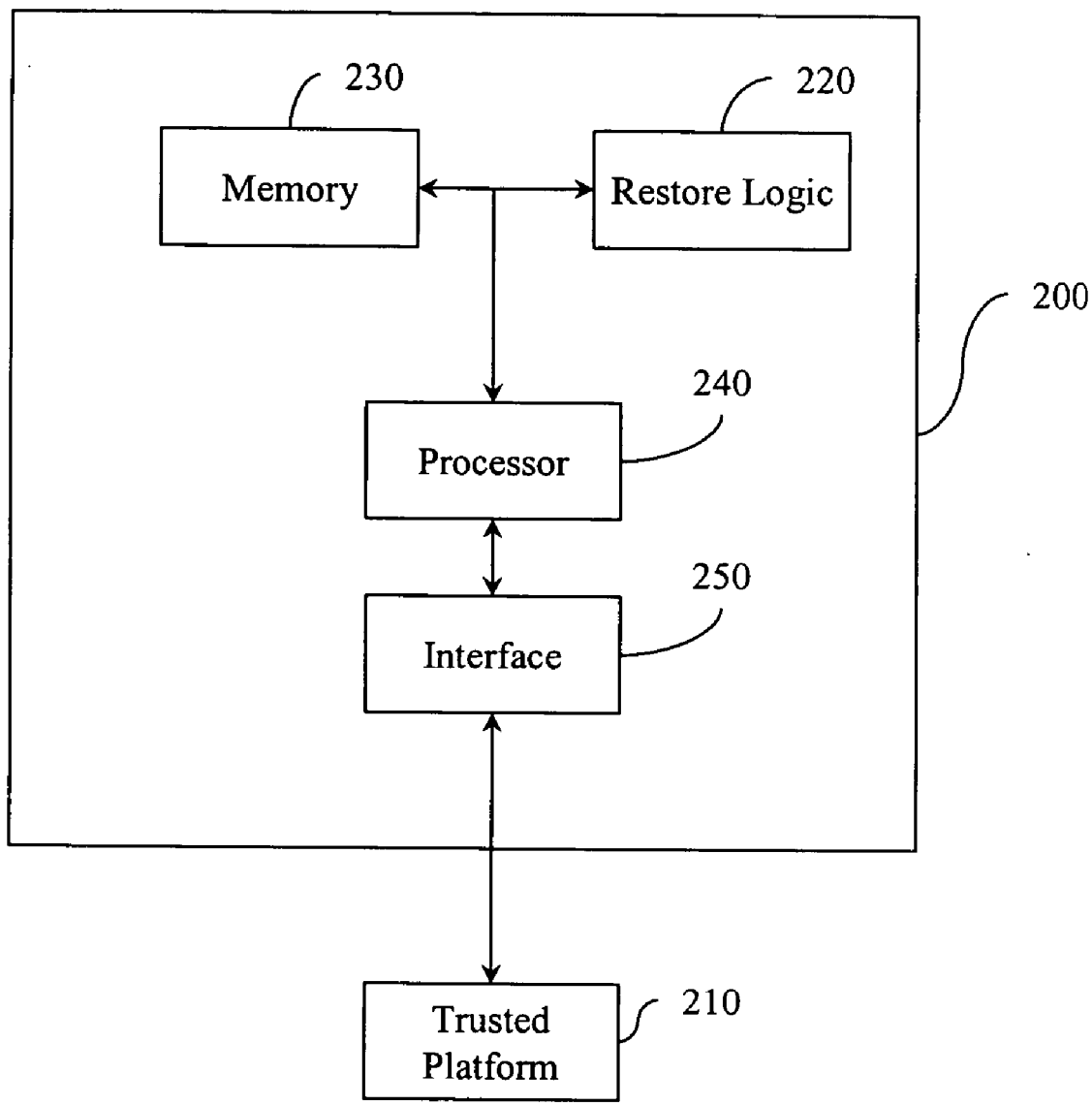
FIG. 2 illustrates another example STPM.

FIG. 2 illustrates another example STPM 200. The STPM 200 may be configured to perform cryptographic key maintenance and/or migration operations like those described above for a trusted platform 210. Thus, the STPM 200 may include a restore logic 220 configured to perform the cryptographic key maintenance and/or cryptographic key migration. To facilitate performing these actions securely, the STPM 200 may be bound to the trusted platform 210 in a one-to-one manner.

The STPM 200 may also include a memory 230 operably connected to the restore logic 220. The memory 230 may be configured to store items including, but not limited to, a storage root key, and a set of processor executable instructions associated with performing a cryptographic key maintenance and/or migration operation. Thus, adding the memory 230 facilitates having the STPM 200 perform intelligent actions like interrogating the trusted platform 210 when the STPM 200 becomes operably connected to the trusted platform 210 and so on.

The STPM 200 may also include a processor 240 that is operably connected to the restore logic 220 and/or the memory 230. The processor 240 may be configured to perform actions like a cryptographic key maintenance operation, and an interface action associated with operably connecting the STPM 200 to the trusted platform 210. Adding the processor 240 facilitates having the STPM 200 autonomously perform intelligent actions like automatically executing processor executable instructions when the STPM 200 is operably connected to the trusted platform 210, and to manage a key hierarchy associated with the trusted platform 210.

The STPM 200 may also include an interface 250 that is configured to facilitate operably connecting the STPM 200 to a trusted platform 210. The interface may facilitate connecting the STPM 200 to the trusted platform 210 by interfaces including, but not limited to, USB, SCSI, ISA, EISA, PCI, and MCA. In one example, the STPM 200 may be embodied as a Universal Serial Bus token (e.g., a hardware device that can be inserted into a platform via a USB connector). In another example, the STPM 200 may be embodied as an ASIC that can be plugged into a socket on the trusted platform 210. While an ASIC and a USB token are described, it is to be appreciated that the STPM 200 may be implemented in other forms including, but not limited to, hardware, software, firmware, and combinations thereof.

Figure 3:
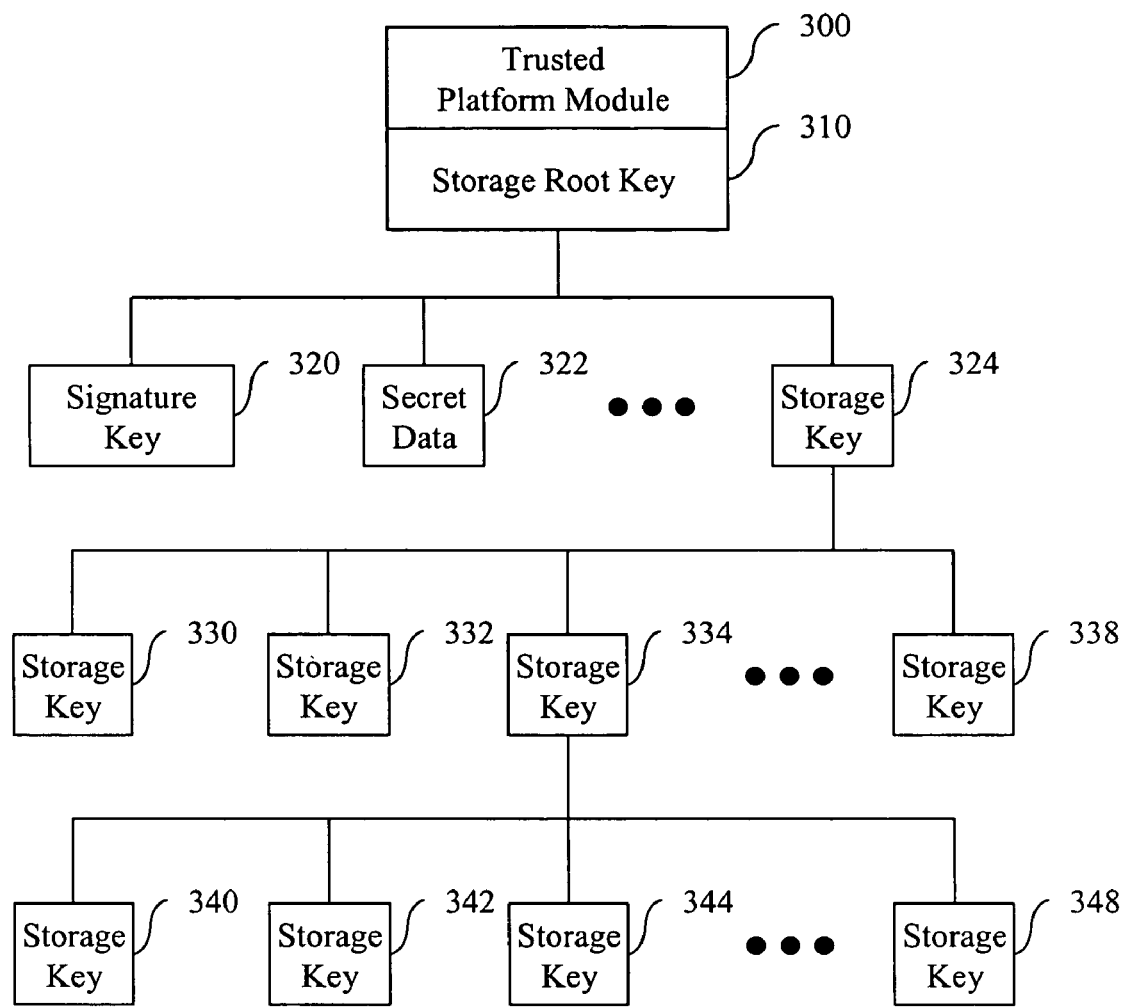
FIG. 3 illustrates an example cryptographic key hierarchy.

FIG. 3 illustrates an example key/secret hierarchy associated with a TPM 300. The TPM 300 may wrap a storage root key 310. The storage root key 310 may then be employed to encrypt other elements of the hierarchy like a signature key 320, a secret data 322 and a storage key 324. While three items are shown in the second level of the hierarchy, it is to be appreciated that the storage root key 310 may be employed to encrypt a greater and/or lesser number of items. While the storage root key 310 may be stored in the trusted platform module 300, the other items in the storage hierarchy like the signature key 320 will not be stored in the trusted platform module 300. Therefore, the storage hierarchy can theoretically be of an infinite size.

In the illustrated hierarchy, storage key 324 is in turn used to encrypt a third level of items like storage keys 330 through 338. Similarly, storage key 334 is then used to encrypt a fourth level of items like storage keys 340 through 348. While four levels are illustrated in the hierarchy, it is to be appreciated that a greater and/or lesser number of levels and items can appear in a hierarchy. If the trusted platform module went bad, then the storage root key 310 might not be available to decrypt the items on the second level of the hierarchy like storage key 324. Therefore, not only would the second level of items be unavailable, but the lower levels would also be unavailable. Therefore, the example systems and methods described herein facilitate backing up the storage root key 310 stored in the trusted platform module 300 in a subordinate trusted platform module (not illustrated). The example systems and methods may also facilitate logically attaching the storage root key backed up in the subordinate trusted platform module to the root of the hierarchy, making the hierarchy useful once again.

Figure 4:
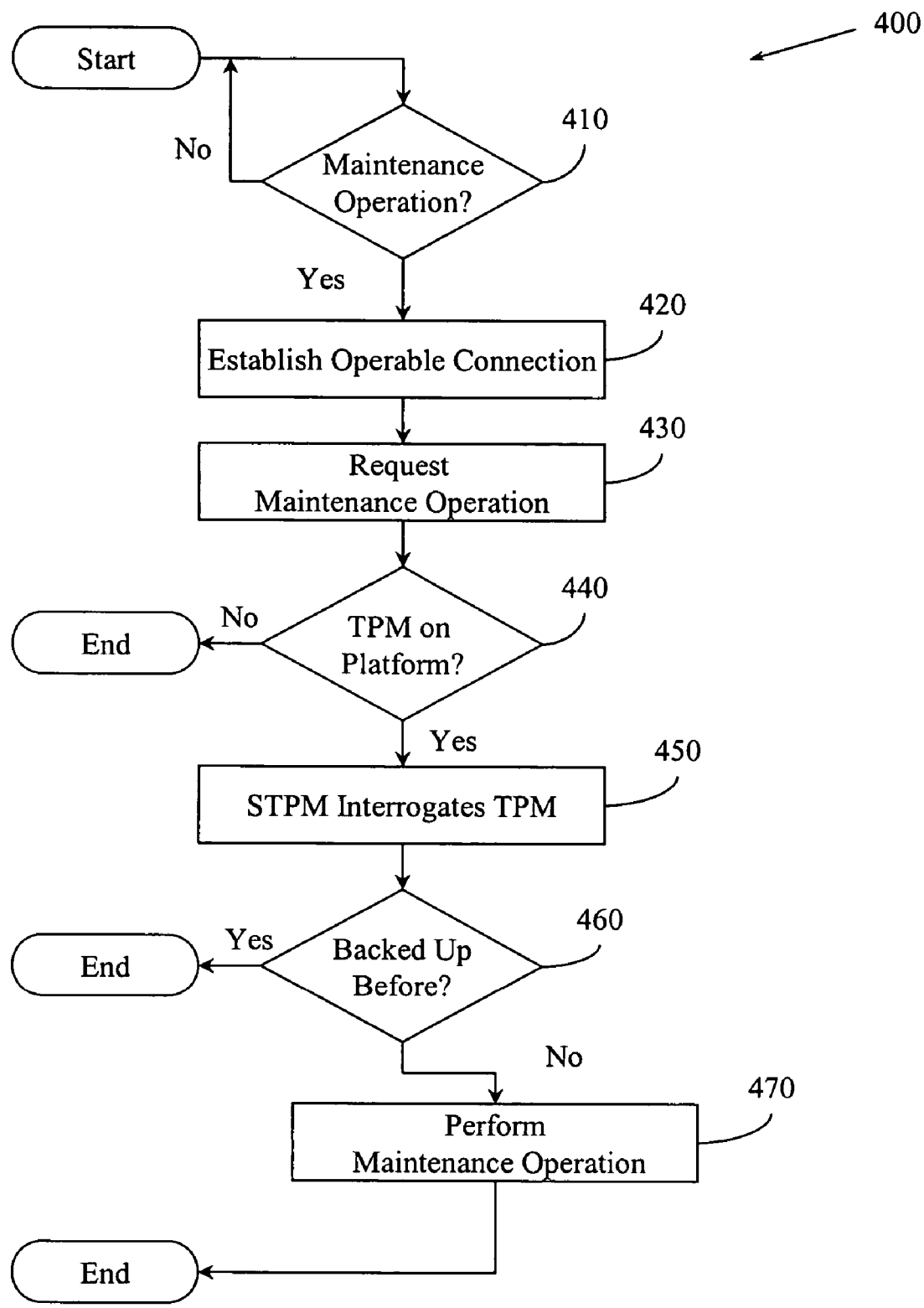
FIG. 4 illustrates an example method related to cryptographic key and/or secret maintenance.
Figure 5:
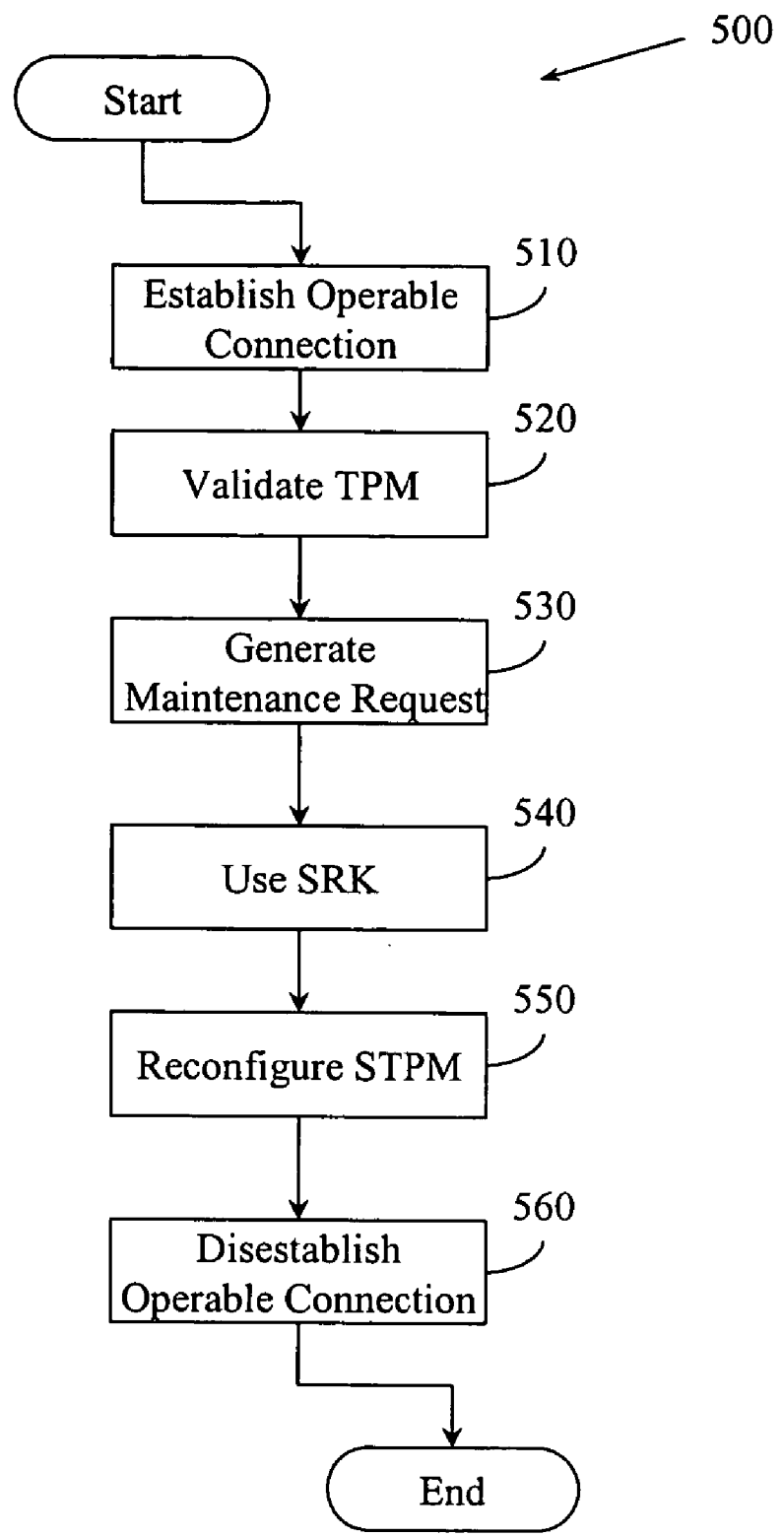
FIG. 5 illustrates another example method related to cryptographic key and/or secret maintenance.

Example methods may be better appreciated with reference to the flow diagrams of FIGS. 4 and 5. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Furthermore, additional and/or alternative methodologies can employ additional, not illustrated blocks.

In the flow diagrams, blocks denote "processing blocks" that may be implemented with logic. A flow diagram does not depict syntax for any particular programming language, methodology, or style (e.g., procedural, object-oriented). Rather, a flow diagram illustrates functional information one skilled in the art may employ to develop logic to perform the illustrated processing. It will be appreciated that in some examples, program elements like temporary variables, routine loops, and so on are not shown. It will be further appreciated that electronic and software applications may involve dynamic and flexible processes so that the illustrated blocks can be performed in other sequences that are different from those shown and/or that blocks may be combined or separated into multiple components. It will be appreciated that the processes may be implemented using various programming approaches like machine language, procedural, object oriented and/or artificial intelligence techniques.

FIG. 4 illustrates an example method 400 for securely backing up a cryptographic key stored in a trusted platform module associated with a trusted platform. The method 400 may include, at 410, determining whether to perform a cryptographic key maintenance operation. If the determination at 410 is No, then the method 400 may wait and try again later, or may terminate. But, if the determination at 410 is Yes, then upon determining to perform the cryptographic key maintenance operation, the method 400 may include, at 420, establishing an operable connection between a subordinate trusted platform module and the trusted platform. Establishing an operable connection can include making a physical and/or logical connection between a subordinate trusted platform module and the trusted platform for which the maintenance operation is to be performed. For example, establishing an operable connection at 420 between the subordinate trusted platform module and the trusted platform may include inserting a Universal Serial Bus token into a Universal Serial Bus interface associated with the trusted platform and/or updating one or more data structures in the subordinate trusted platform module and/or the trusted platform.

Once the operable connection is established, then the method 400 may proceed, at 430, by requesting that the subordinate trusted platform module perform the cryptographic key maintenance operation. But the subordinate trusted platform module may not simply automatically perform the operation. Thus, the method 400 may include controlling the subordinate trusted platform module to determine, at 440, whether a trusted platform module is associated with the trusted platform. If the determination at 440 is No, then the method 400 may terminate. But if the determination at 440 is Yes, then the method 400 may include, at 450, controlling the subordinate trusted platform module to interrogate the trusted platform. The interrogation may facilitate determining, for example, at 460, whether the trusted platform has previously had the cryptographic key stored in its trusted platform module backed up (e.g., written to a subordinate trusted platform module). If the storage root key has already been backed up, then the method 400 may terminate after 460. But if the storage root key has not been backed up, then the method 400 may include, at 470 performing the cryptographic key maintenance operation to copy the cryptographic key stored in the trusted platform module to the subordinate trusted platform module.

In one example, the subordinate trusted platform module may support and/or implement functionalities defined in a TCG specification (e.g., version 1.1b). For example, the subordinate trusted platform module may support functionalities including, but not limited to, TPM_LoadManualMaintPub, TPM_ReadManualMaintPub, and so on. While method 400 concerns performing a cryptographic key maintenance operation from the point of view of a trusted platform, computerized methods may also be implemented to support and/or perform a cryptographic key maintenance operation from the point of view of a subordinate trusted platform module.

By way of illustration, a computerized method for securely backing up, in a subordinate trusted platform module, a storage root key stored in a trusted platform module may include establishing an operable connection between the subordinate trusted platform module and the trusted platform module. After the operable connection is made, the method may include receiving a request to back up the storage root key. But the request may not be performed instantaneously, it may depend on whether the storage root key has already been backed up. Therefore the method may include determining whether the storage root key has been previously backed up and upon determining that the storage root key has not been previously backed up, copying the storage root key to the subordinate trusted platform module. Having stored the storage root key on the subordinate trusted platform module, the method may include establishing a one-to-one binding between the subordinate trusted platform module and the trusted platform module. The one-to-one binding may be established by, for example, producing a public/private key pair that facilitates authenticating the two related devices, by storing unique identifiers in memory associated with the two related devices, and so on. Finally, the method may include disestablishing the operable connection between the subordinate trusted platform module and the trusted platform module.

While FIG. 4 illustrates various actions occurring in serial, it is to be appreciated that various actions illustrated in FIG. 4 could occur substantially in parallel. By way of illustration, a first process could determine when to perform a maintenance operation and establish an operable connection. Similarly, a second process could control the STPM to interrogate the TPM, while a third process could perform the maintenance operation. While three processes are described, it is to be appreciated that a greater and/or lesser number of processes could be employed and that lightweight processes, regular processes, threads, and other approaches could be employed.

FIG. 5 illustrates a method 500 for employing a cryptographic key stored in a subordinate trusted platform module. The method 500 includes, at 510, establishing an operable connection between the subordinate trusted platform module and a trusted platform associated with a key hierarchy produced by a trusted platform module. In one example, establishing the operable connection between the subordinate trusted platform module and the trusted platform includes inserting the subordinate trusted platform module into a Universal Serial Bus interface operably connected to the trusted platform.

Method 500 may facilitate attaching a storage root key backed up in the subordinate trusted platform module to the root of the key hierarchy that may be inaccessible due to a failure of the trusted platform module that created it but whose storage root key was backed up into the subordinate trusted platform module.

The method 500 may, therefore, also include, at 520, validating that the trusted platform can interact with the subordinate trusted platform module and can employ the cryptographic key. This may include, for example, determining that there is a one-to-one binding between the subordinate trusted platform module and the trusted platform. If the validation succeeds, then the method 500 may proceed, at 530, to generate a request to employ the cryptographic key. This request may be transmitted, for example, from the trusted platform whose trusted platform module went bad to the subordinate trusted platform module that has been operably connected to the trusted platform.

As a result of the maintenance request, the method 500 may include, at 540, associating the cryptographic key (e.g., the storage root key) with the key hierarchy and then using the storage root key td, for example, decrypt an encrypted item in the key hierarchy. Associating the cryptographic key with the key hierarchy may include, for example, logically connecting the cryptographic key to a root of the key hierarchy.

Having retrieved the storage root key from the subordinate trusted platform module, the trusted platform may now control, at 550, the subordinate trusted platform module to be reconfigured to indicate that the subordinate trusted platform module performed a requested maintenance operation. By way of illustration, the subordinate trusted platform module may be reconfigured to prevent it from releasing the stored storage root key again. By way of further illustration, controlling the subordinate trusted platform module to be reconfigured to indicate that the subordinate trusted platform module performed the requested maintenance operation may include causing the subordinate trusted platform module to be disabled from performing a subsequent maintenance operation.

The method 500 may conclude, at 560, by disestablishing the operable connection between the subordinate trusted platform module and the trusted platform. In one example, disestablishing the operable connection between the subordinate trusted platform module and the trusted platform may include removing the subordinate trusted platform module from a Universal Serial Bus interface operably connected to the trusted platform and breaking a one-to-one binding between the subordinate trusted platform module and the trusted platform.

Once again, the method 500 describes retrieving an SRK from the point of view of a trusted platform. However, a computerized method for providing a storage root key stored in a subordinate trusted platform module to a trusted platform may also be described from the point of view of the subordinate trusted platform module.

This method may include establishing an operable connection between the subordinate trusted platform module and the trusted platform and validating that the subordinate trusted platform module can interact with the trusted platform (e.g., verifying one-to-one binding). Additionally, the method may include determining whether a trusted platform module associated with the trusted platform is functional (e.g., is the TPM actually bad?). Upon determining that the trusted platform module is not functional, then the method may include providing the storage root key to the trusted platform. The storage root key may be transferred, for example, across the operable connection. Having disgorged its storage root key, the STPM may then reconfigure itself to indicate that the storage root key has been provided to the trusted platform. After reconfiguring, the STMP may disestablish the operable connection between the subordinate trusted platform module and the trusted platform.

Thus, having described general methods for providing a backup copy of a storage root key from an STPM to a trusted platform whose TPM has gone bad—and thus whose key hierarchy may be inaccessible—a more specific method can be described. This method includes decrypting an item encrypted by a failed trusted platform module by associating a subordinate trusted platform module that has been bound in a one-to-one manner with the failed trusted platform module with a trusted platform associated with the failed trusted platform module. After the association, the method includes determining that the failed trusted platform module is not operational. Having determined that the failed TPM is not operational, the method then proceeds to decrypt the item using a copy of a storage root key stored in the subordinate trusted platform module, where the copy of the storage root key came from the failed trusted platform module.

While FIG. 5 illustrates various actions occurring in serial, it is to be appreciated that various actions illustrated in FIG. 5 could occur substantially in parallel. By way of illustration, a first process could establish an operable connection, a second process could validate the TPM, a third process could generate maintenance requests, a fourth process could use the storage root key (e.g., decrypt items), and a fifth process could reconfigure the STPM and break down the operable connection. While five processes are described, it is to be appreciated that a greater and/or lesser number of processes could be employed and that lightweight processes, regular processes, threads, and other approaches could be employed.

In one example, methodologies are implemented as processor executable instructions and/or operations stored on a computer-readable medium. Thus, in one example, a computer-readable medium may store processor executable instructions operable to perform a method for securely backing up in a subordinate trusted platform module a storage root key stored in a trusted platform module. The method may include receiving a request to back up the storage root key, determining whether the storage root key has been previously backed up, selectively copying the storage root key to the subordinate trusted platform module, and establishing a one-to-one binding between the subordinate trusted platform module and the trusted platform module. While the above method is described being stored on a computer-readable medium, it is to be appreciated that other example methods described herein can also be stored on a computer-readable medium.

Figure 6:
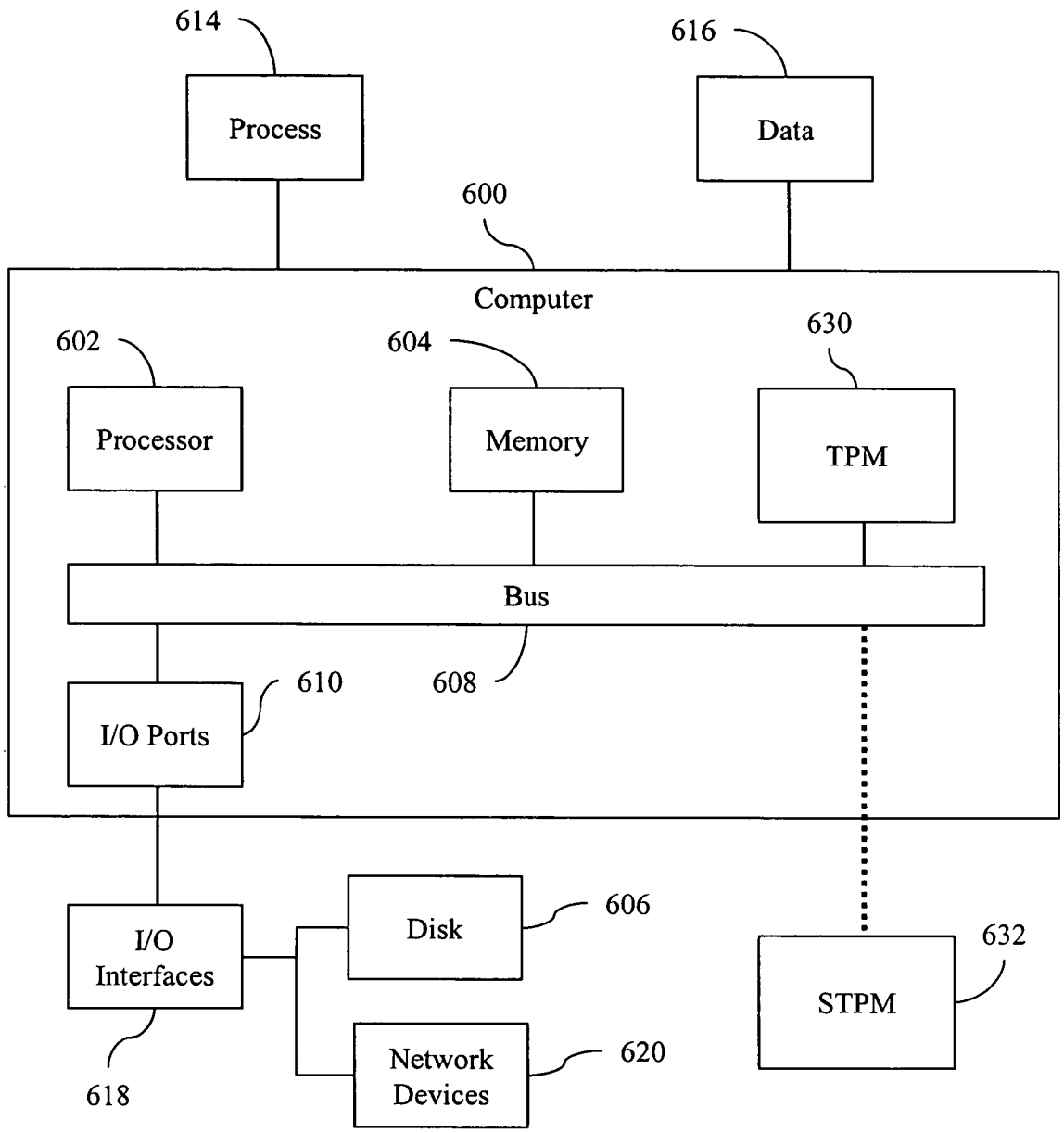
FIG. 6 illustrates an example computing environment in which example systems and methods illustrated herein can operate.

FIG. 6 illustrates a computer 600 that includes a processor 602, a memory 604, and input/output ports 610 operably connected by a bus 608. In one example, the computer 600 may include a TPM 630 configured to facilitate actions like those described for a TPM by the TCG specification. As illustrated above, TPM 630 may fail. Thus computer 600 may be configured to be detachably, operably connected to an STPM 632. The STPM 632 may be similar to example systems described herein and may perform example methods like those described herein. While STPM 632 is illustrated being connected to bus 608, it is to be appreciated that STPM 632 may be interfaced with computer 600 using other operable connections (e.g., USB, SCSI, PCI).

The processor 602 can be a variety of various processors including dual microprocessor and other multi-processor architectures. The memory 604 can include volatile memory and/or non-volatile memory. The non-volatile memory can include, but is not limited to, ROM, PROM, EPROM, EEPROM, and the like. Volatile memory can include, for example, RAM, synchronous RAM (SRAM), dynamic RAM (DRAM), synchronous DRAM (SDRAM), double data rate SDRAM (DDR SDRAM), and direct RAM bus RAM (DRRAM).

A disk 606 may be operably connected to the computer 600 via, for example, an input/output interface (e.g., card, device) 618 and an input/output port 610. The disk 606 can include, but is not limited to, devices like a magnetic disk drive, a solid state disk drive, a floppy disk drive, a tape drive, a Zip drive, a flash memory card, and/or a memory stick. Furthermore, the disk 606 can include optical drives like a CD-ROM, a CD recordable drive (CD-R drive), a CD rewriteable drive (CD-RW drive), and/or a digital video ROM drive (DVD ROM). The memory 604 can store processes 614 and/or data 616, for example. The disk 606 and/or memory 604 can store an operating system that controls and allocates resources of the computer 600.

The bus 608 can be a single internal bus interconnect architecture and/or other bus or mesh architectures. The bus 608 can be of a variety of types including, but not limited to, a memory bus or memory controller, a peripheral bus or external bus, a crossbar switch, and/or a local bus. While a single bus is illustrated, it is to be appreciated that computer 600 may communicate with various devices, logics, and peripherals using other busses that are not illustrated (e.g., PCIE, SATA, Infiniband, 1394, USB, Ethernet). The local bus can be of varieties including, but not limited to, an industrial standard architecture (ISA) bus, a microchannel architecture (MSA)

bus, an extended ISA (EISA) bus, a peripheral component interconnect (PCI) bus, a universal serial (USB) bus, and a small computer systems interface (SCSI) bus.

The computer 600 may interact with input/output devices via i/o interfaces 618 and input/output ports 610. Input/output devices can include, but are not limited to, a keyboard, a microphone, a pointing and selection device, cameras, video cards, displays, disk 606, network devices 620, and the like. The input/output ports 610 can include but are not limited to, serial ports, parallel ports, and USB ports.

The computer 600 can operate in a network environment and thus may be connected to network devices 620 via the i/o devices 618, and/or the i/o ports 610. Through the network devices 620, the computer 600 may interact with a network. Through the network, the computer 600 may be logically connected to remote computers. The networks with which the computer 600 may interact include, but are not limited to, a local area network (LAN), a wide area network (WAN), and other networks. The network devices 620 can connect to LAN technologies including, but not limited to, fiber distributed data interface (FDDI), copper distributed data interface (CDDI), Ethernet (IEEE 802.3), token ring (IEEE 802.5), wireless computer communication (IEEE 802.11), Bluetooth (IEEE 802.15.1), and the like. Similarly, the network devices 620 can connect to WAN technologies including, but not limited to, point to point links, circuit switching networks like integrated services digital networks (ISDN), packet switching networks, and digital subscriber lines (DSL).

In one example, the computer 600 may be configured with a trusted platform module and an interface operably connected to the computer 600, where the interface is configured to facilitate operably, detachably connecting a subordinate trusted platform module to the computer 600. A printer, a cellular telephone, a digital camera, and other similar intelligent electronic devices may similarly be configured with the trusted platform module and the interface.

Figure 7:
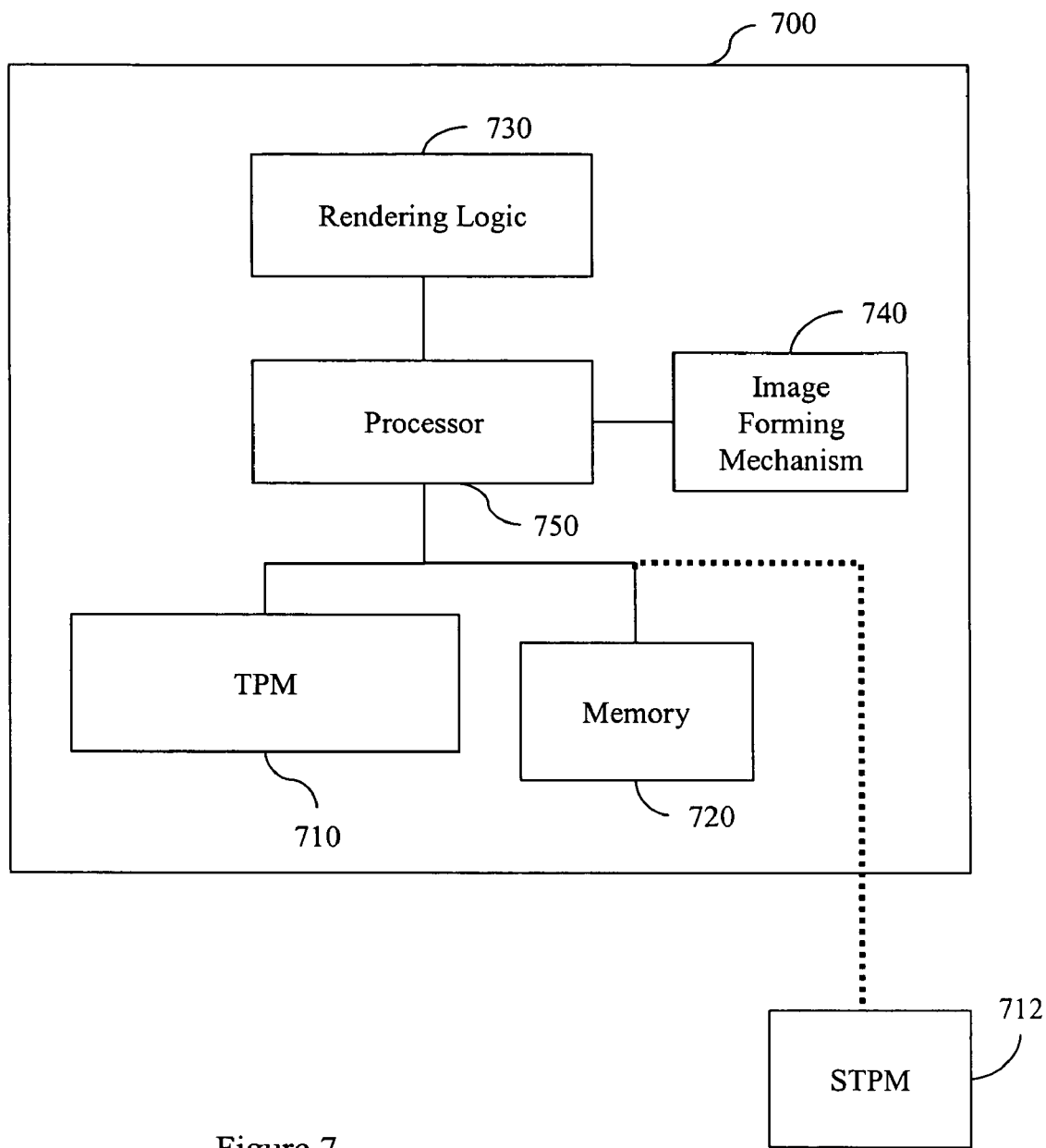
FIG. 7 illustrates an example image forming device in which example systems and methods illustrated herein can operate.

FIG. 7 illustrates an example image forming device 700 that includes a TPM 710. The TPM 710 may fail. Thus the image forming device 700 may be configured to be detachably, operably connected to an STPM 712. The STPM 712 may be configured like the example systems described herein. Similarly, the STPM 712 may include a logic(s) that is configured to perform executable methods like the examples described herein. The STPM 712 may be permanently and/or removably attached to the image forming device 700.

The image forming device 700 may receive print data to be rendered. Thus, image forming device 700 may also include a memory 720 configured to store print data or to be used more generally for image processing. The image forming device 700 may also include a rendering logic 730 configured to generate a printer-ready image from print data. Rendering varies based on the format of the data involved and the type of imaging device. In general, the rendering logic 730 converts high-level data into a graphical image for display or printing (e.g., the print-ready image). For example, one form is ray-tracing that takes a mathematical model of a three-dimensional object or scene and converts it into a bitmap image. Another example is the process of converting HTML into an image for display/printing. It is to be appreciated that the image forming device 700 may receive printer-ready data that does not need to be rendered and thus the rendering logic 730 may not appear in some image forming devices.

The image forming device 700 may also include an image forming mechanism 740 configured to generate an image onto print media from the print-ready image. The image forming mechanism 740 may vary based on the type of the imaging device 700 and may include a laser imaging mechanism, other toner-based imaging mechanisms, an ink jet mechanism, digital imaging mechanism, or other imaging reproduction engine. A processor 750 may be included that is implemented with logic to control the operation of the image-forming device 700. In one example, the processor 750 includes logic that is capable of executing Java instructions. Other components of the image forming device 700 are not described herein but may include media handling and storage mechanisms, sensors, controllers, and other components involved in the imaging process.

Figure 8:
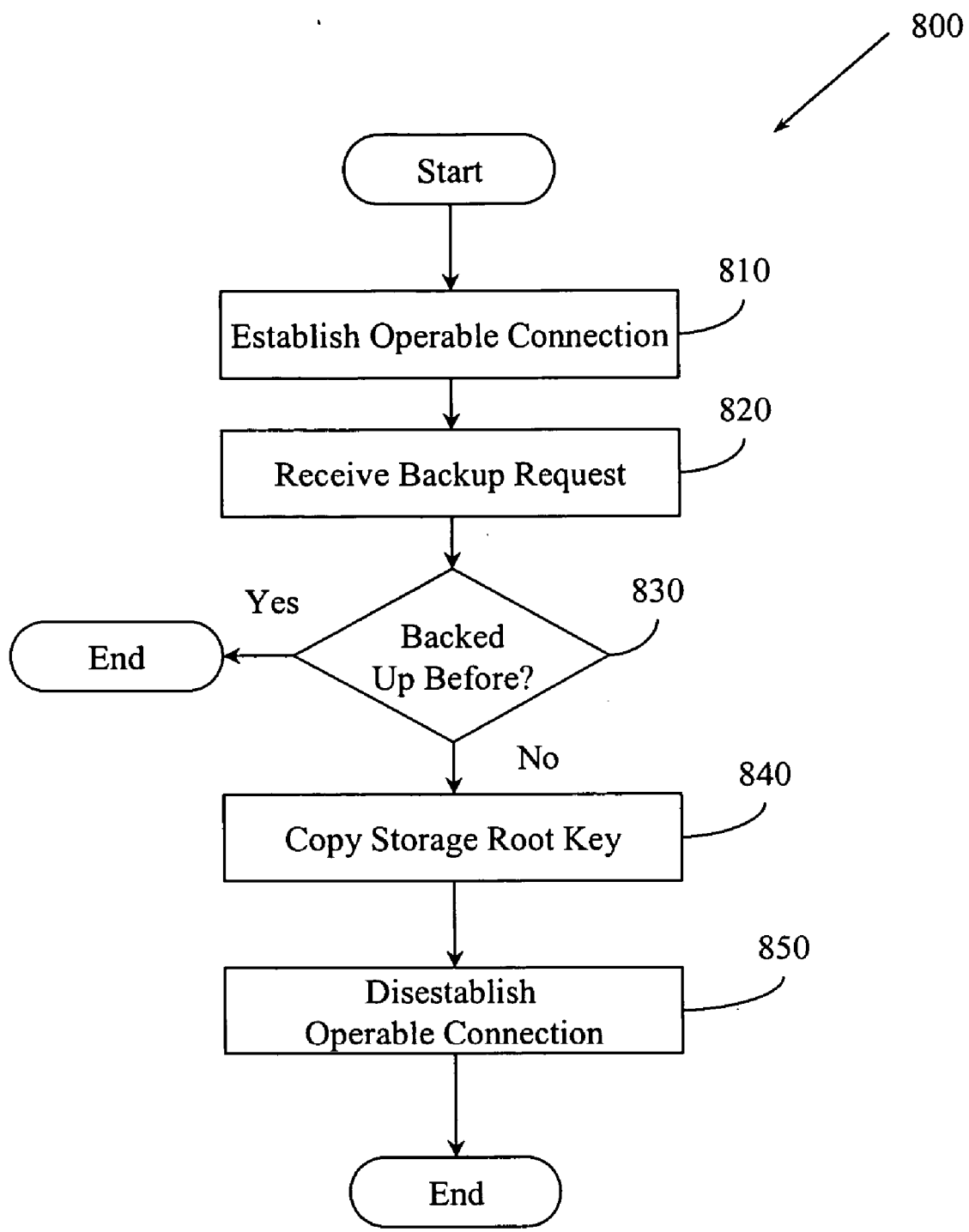
FIG. 8 illustrates an example method for securely backing up a storage root key.

FIG. 8 illustrates an example computerized method 800 for securely backing up, in a subordinate trusted platform module, a storage root key stored in a trusted platform module. The method 800 may include, at 810, establishing an operable connection between the subordinate trusted platform module and the trusted platform module and, at 820, receiving a request to back up the storage root key. At 830, a determination can be made concerning whether the storage root key has been previously backed up. If the determination is Yes, then the method 800 may terminate. But, upon determining at 830 that the storage root key has not been previously backed up, the method 800 may continue, at 840, by copying the storage root key to the subordinate trusted platform module, and then, at 850, by disestablishing the operable connection between the subordinate trusted platform module and the trusted platform module.

Figure 9:
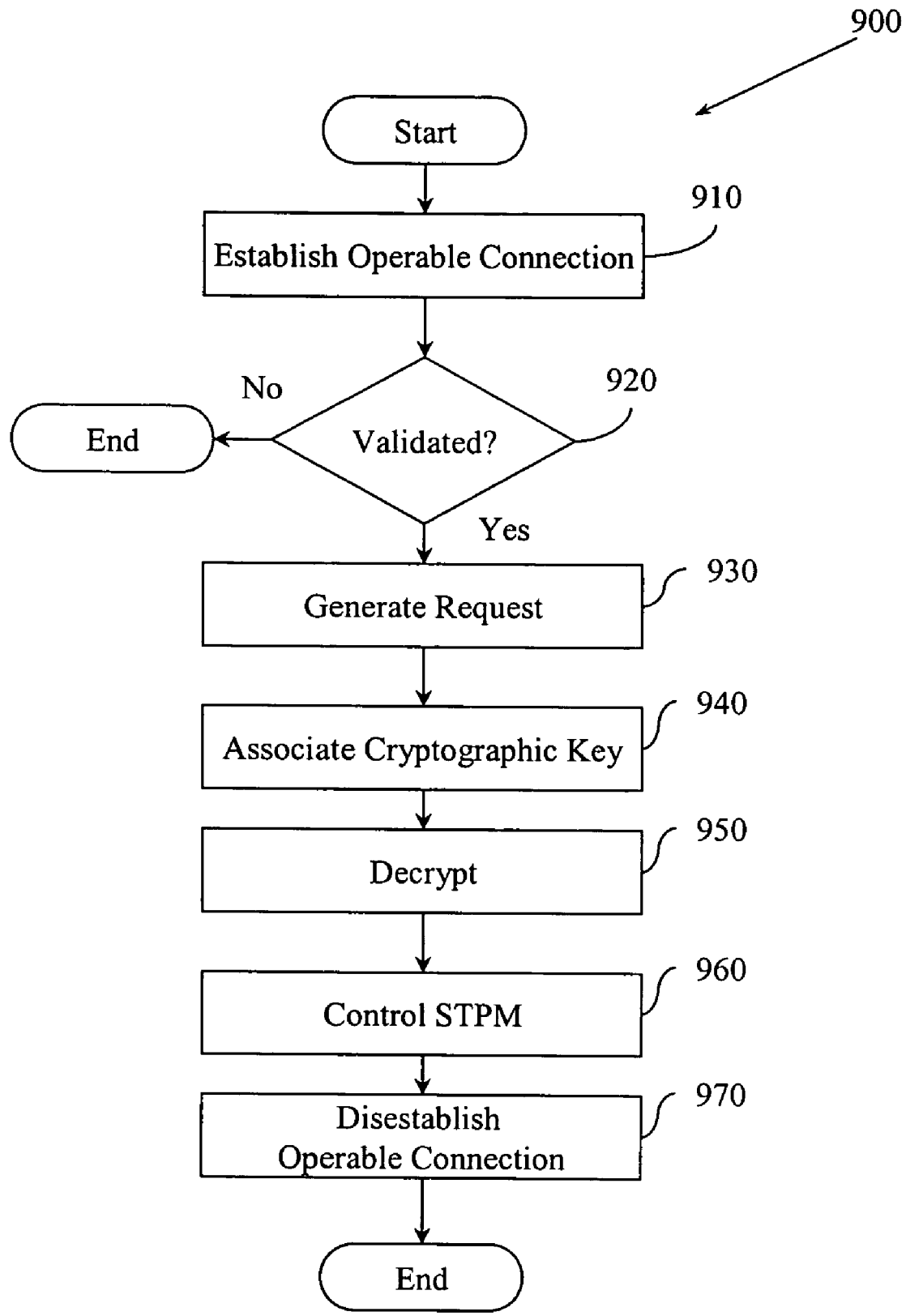
FIG. 9 illustrates an example method for employing a cryptographic key stored in a subordinate trusted platform module.

FIG. 9 illustrates an example computerized method 900 for employing a cryptographic key stored in a subordinate trusted platform module. The method 900 may include, at 910, establishing an operable connection between the subordinate trusted platform module and a trusted platform associated with a key hierarchy produced by a trusted platform module. After the operable connection is established, the method 900 may continue, at 920, by validating that the trusted platform can interact with the subordinate trusted platform module and can employ the cryptographic key. If the trusted platform is validated at 920 then the method 900 may include, at 930, generating a request to employ the cryptographic key. The method 900 may then continue at 940 by associating the cryptographic key with the key hierarchy and, at 950, by decrypting an encrypted item in the key hierarchy using the cryptographic key. At 960, the method 900 may include controlling the subordinate trusted platform module to be reconfigured to indicate that the subordinate trusted platform module performed a requested maintenance operation. After completing the above described actions, at 970, the operable connection between the subordinate trusted platform module and the trusted platform may be disestablished.

Figure 10:
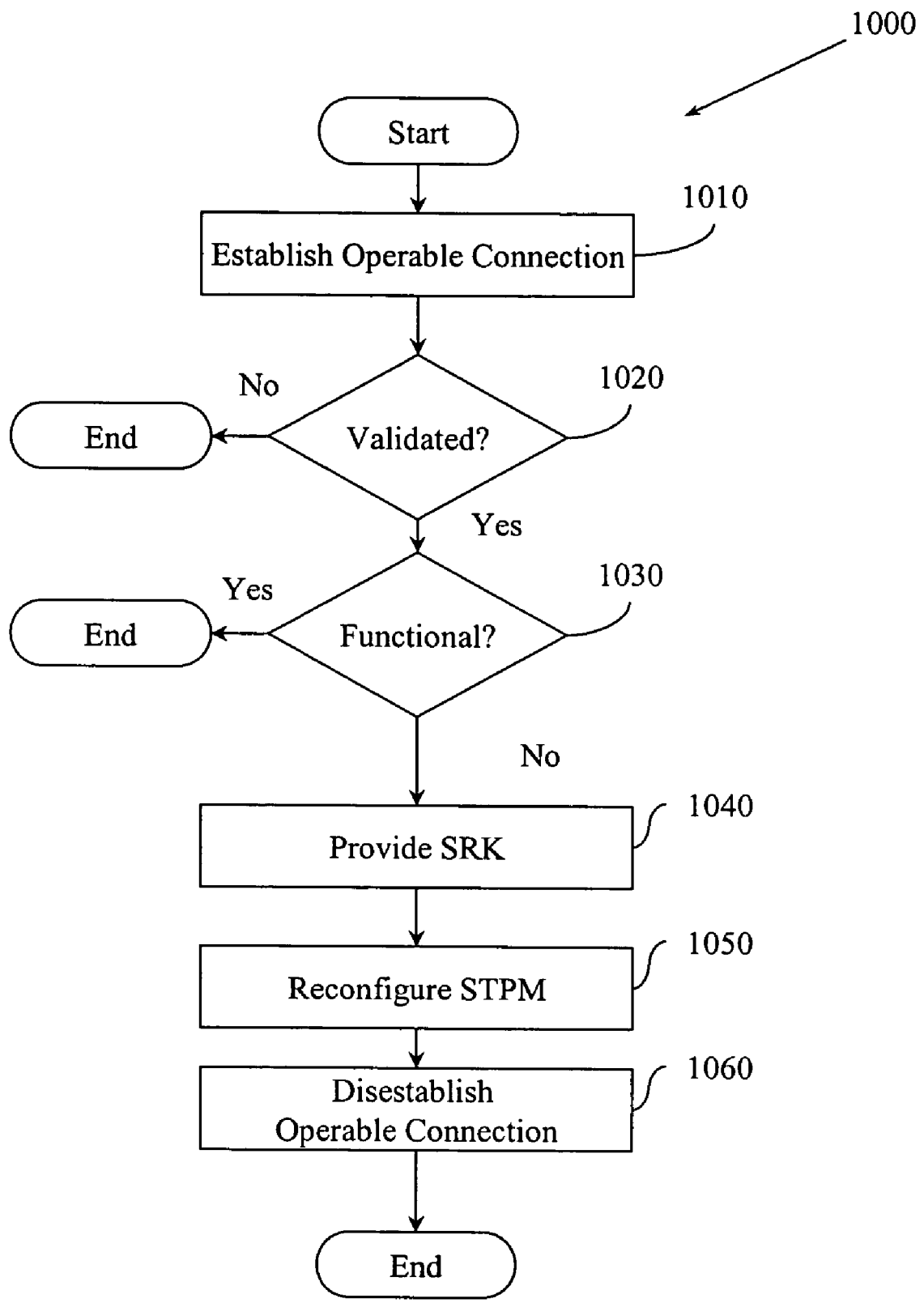
FIG. 10 illustrates an example method for providing a storage root key stored in a subordinate trusted platform module to a trusted platform.

FIG. 10 illustrates an example method 1000 for providing a storage root key stored in a subordinate trusted platform module to a trusted platform. The method 1000 includes, at 1010, establishing an operable connection between the subordinate trusted platform module and the trusted platform, and, at 1020, validating that the subordinate trusted platform module can interact with the trusted platform. If the validation succeeds, then at 1030 a determination can be made concerning whether a trusted platform module associated with the trusted platform is functional. If the determination is that the platform is functional, then the method 1000 may terminate. Otherwise, upon determining that the trusted platform module is not functional, the method 1000 may include, at 1040, providing the storage root key to the trusted platform. At 1050, the subordinate trusted platform module may be reconfigured to indicate that the storage root key has been provided to the trusted platform. After performing the above described actions, at 1060 the operable connection between the subordinate trusted platform module and the trusted platform may be disestablished.

Figure 11:
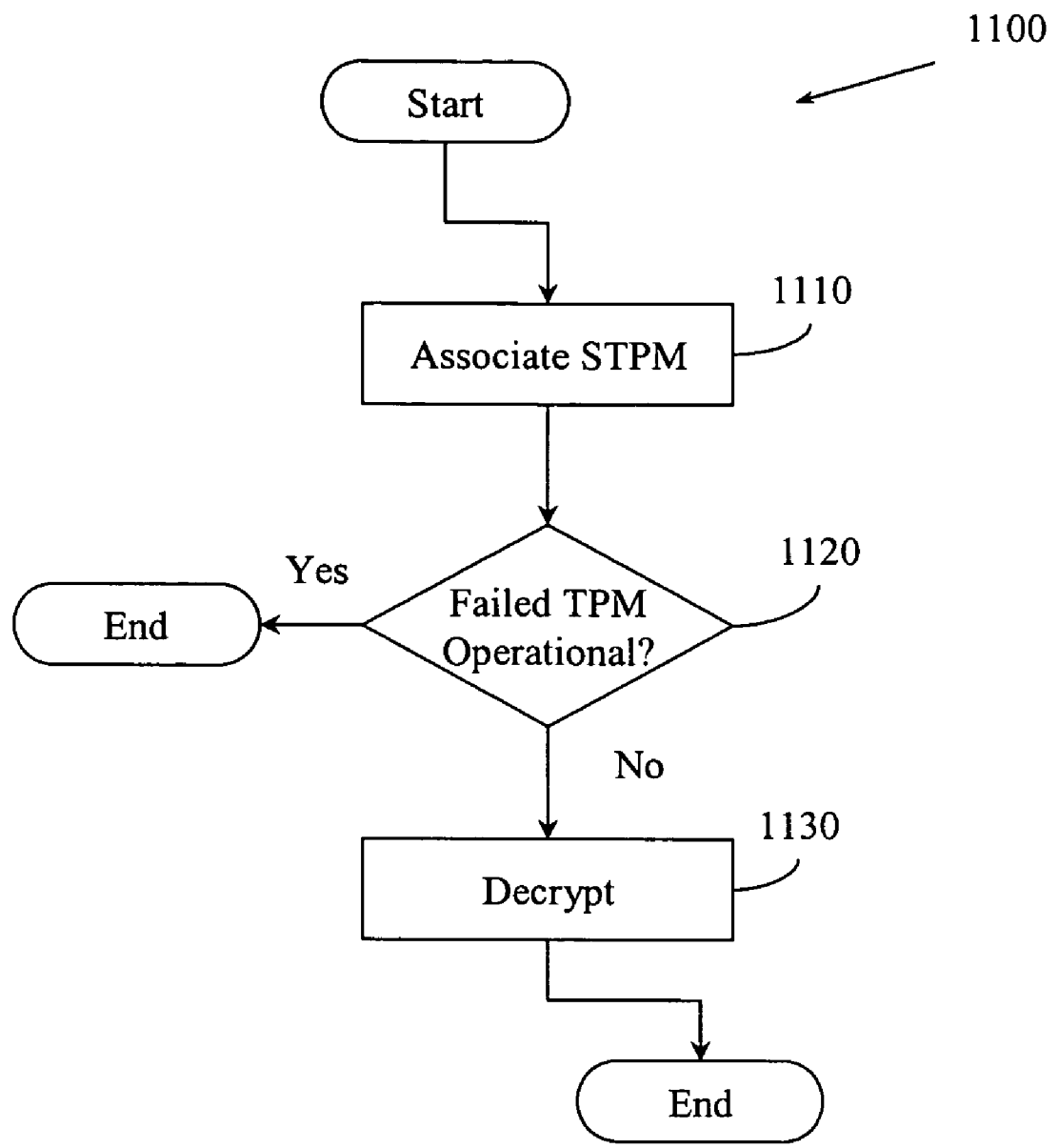
FIG. 11 illustrates an example method for decrypting an item encrypted by a failed trusted platform module.

FIG. 11 illustrates an example method 1100 for decrypting an item encrypted by a failed trusted platform module. The method 1100 may include, at 1110, associating a subordinate trusted platform module that has been bound in a one-to-one manner with the failed trusted platform module with a trusted platform associated with the failed trusted platform module. At 1120, a determination may be made concerning whether the failed trusted platform module is operational. If the failed trusted platform module is operational, then the method 1100 may terminate, otherwise, at 1130, the item may be decrypted using a copy of a storage root key stored in the subordinate trusted platform module. In one example, the copy of the storage root key may come from the failed trusted platform module.

Figure 12:
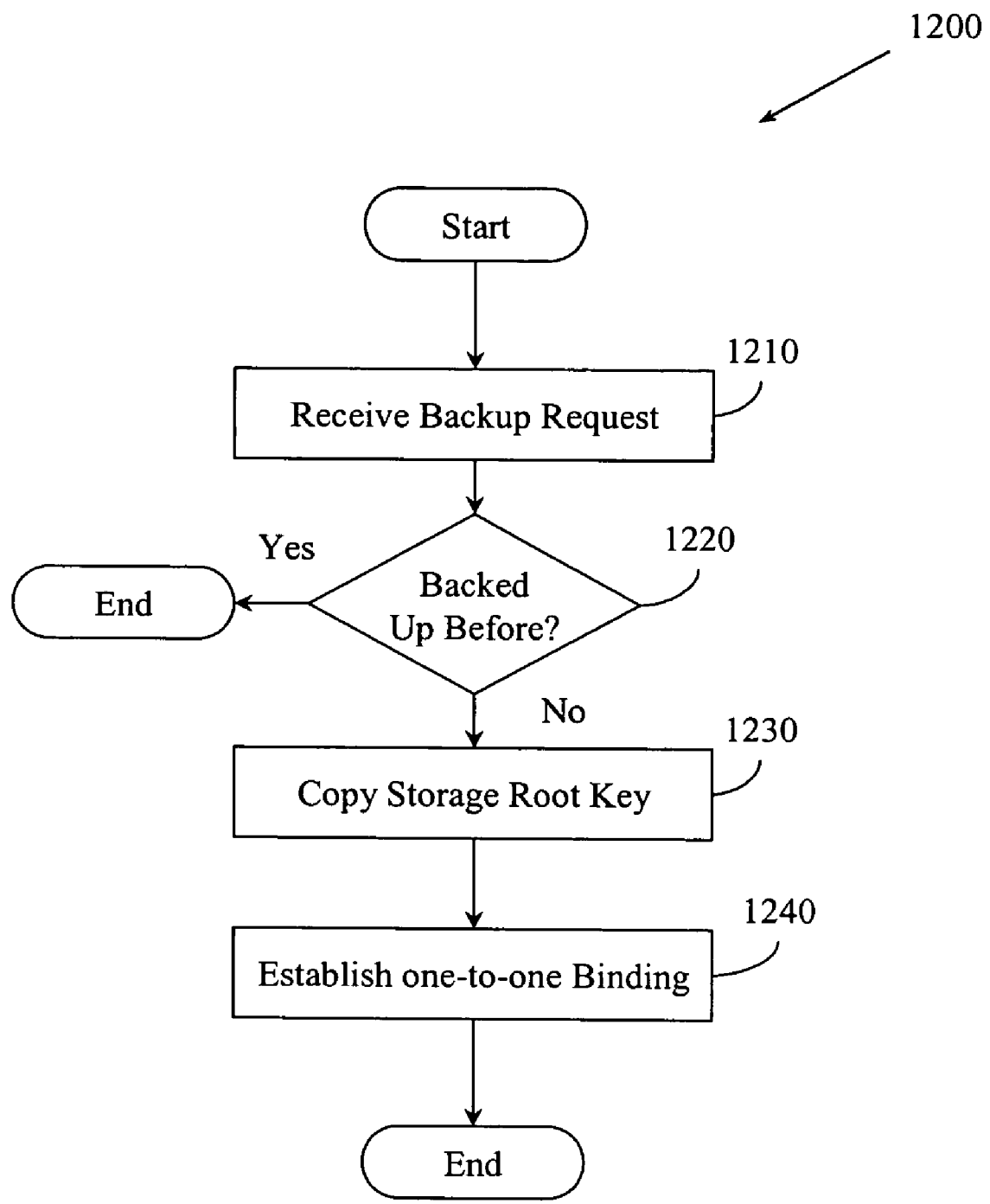
FIG. 12 illustrates an example method for securely backing up a storage root key in a subordinate trusted platform module.

FIG. 12 illustrates an example method 1200 for securely backing up a storage root key. In one example, a computer-readable medium may be configured with processor executable instructions for performing the method 1200. The method 1200 may facilitate securely backing up, in a subordinate trusted platform module, a storage root key stored in a trusted platform module. The method 1200 may include, at 1210, receiving a request to back up the storage root key. Upon receiving the request, at 1220 a determination may be made concerning whether the storage root key has been previously backed up. If the storage root key has been previously backed up, then the method 1200 may terminate. But, upon determining that the storage root key has not been previously backed up, at 1230 the storage root key may be copied to the subordinate trusted platform module and, at 1240 a one-to-one binding may be established between the subordinate trusted platform module and the trusted platform module.

Figure 13:
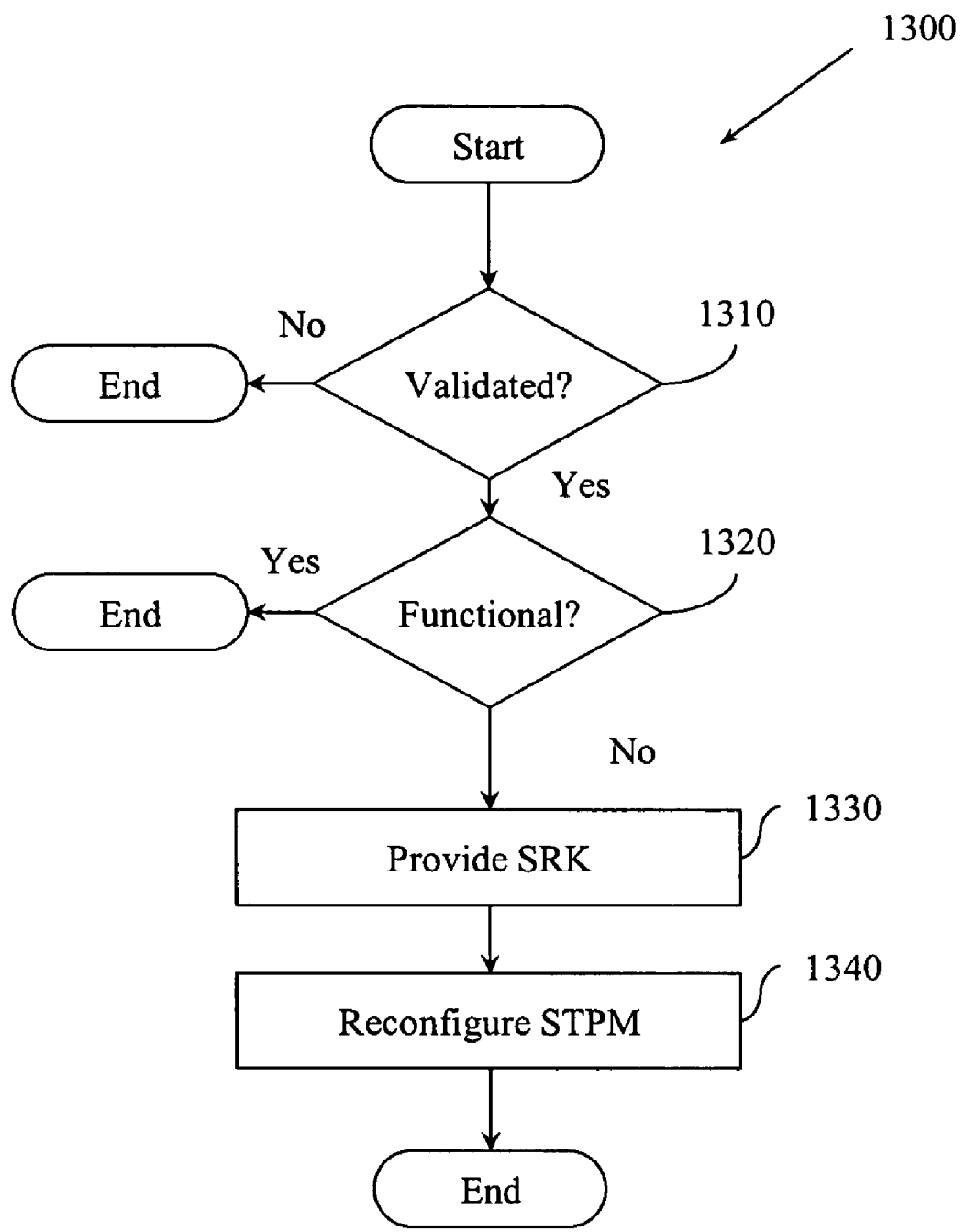
FIG. 13 illustrates an example method for providing a storage root key stored in a subordinate trusted platform module to a trusted platform.

FIG. 13 illustrates an example method 1300. A computer-readable medium may store processor executable instructions operable to perform method 1300. Method 1300 may facilitate providing a storage root key stored in a subordinate trusted platform module to a trusted platform. Method 1300 may include, at 1310, validating that the subordinate trusted platform module can interact with the trusted platform. If it can not interact, then method 1300 may terminate. If it can interact, then at 1320 a determination may be made concerning whether a trusted platform module associated with the trusted platform is functional. If it is functional, then method 1300 may terminate. But upon determining that the trusted platform module is not functional, the storage root key may be provided, at 1330, to the trusted platform and, at 1340, the subordinate trusted platform module may be reconfigured to indicate that the storage root key has been provided to the trusted platform. In one example, reconfiguring the subordinate trusted platform module includes disabling the subordinate trusted platform module from subsequently providing the storage root key.

Figure 14:
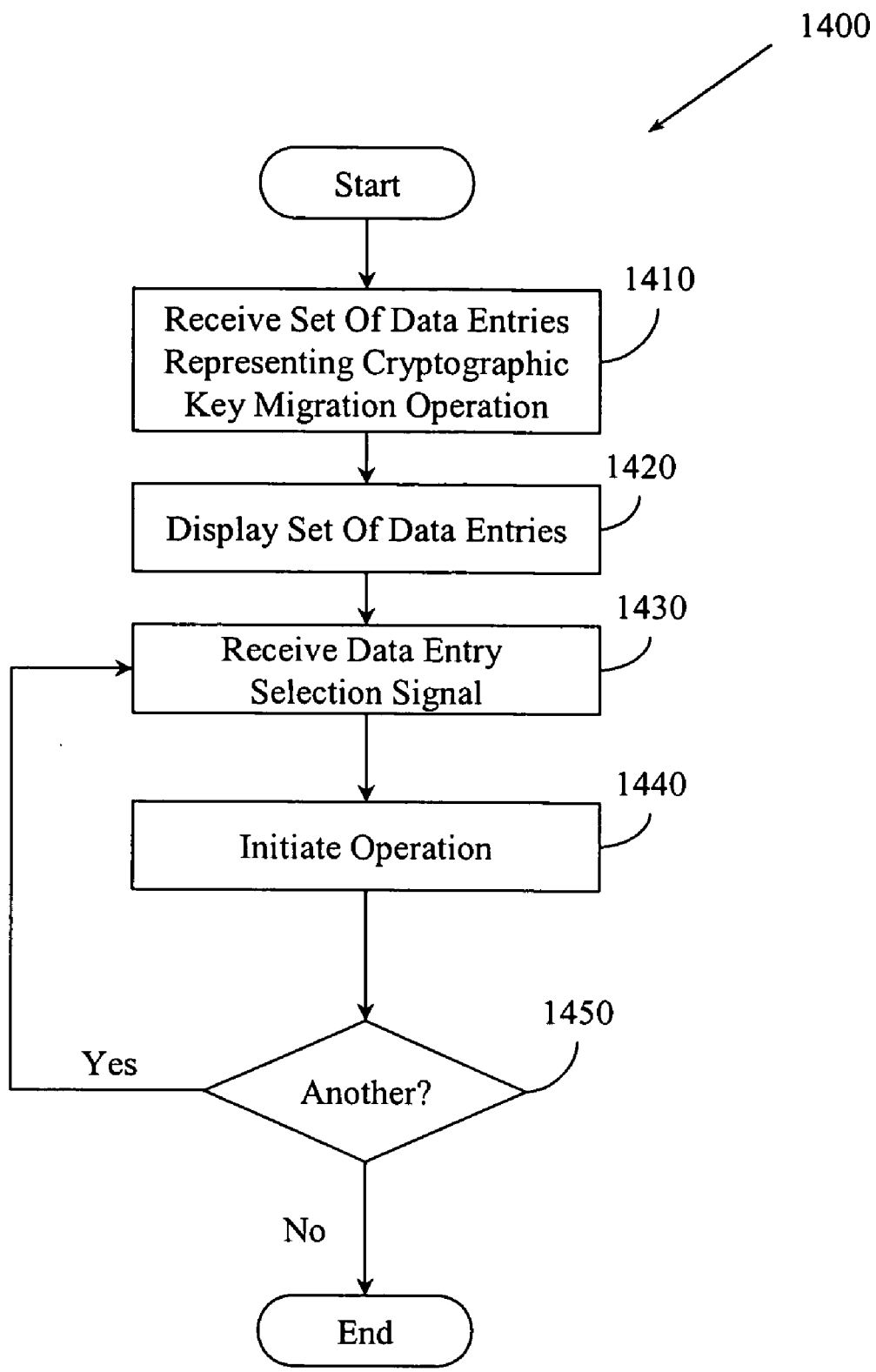
FIG. 14 illustrates an example method associated with a graphical user interface.

FIG. 14 illustrates an example method 1400 that may be associated with a graphical user interface. In a computer system having a graphical user interface that includes a display and a selection device, method 1400 may facilitate providing and selecting from a set of data entries on the display. Method 1400 may include, at 1410, retrieving a set of data entries. A data entry may represent, for example, a cryptographic key maintenance operation, a cryptographic key migration operation, and the like. At 1420, the set of data entries may be displayed on the display and in response to displaying the entries, at 1430, a data entry selection signal indicative of the selection device selecting a selected data entry may be received. In response to the data entry selection signal, at 1440, operations like a cryptographic key maintenance operation and a cryptographic key migration operation associated with the selected data entry may be initiated. At 1450, a determination may be made concerning whether to process another data entry selection signal. If the determination is No, then method 1400 may terminate, otherwise processing may return to 1430.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Additional advantages and modifications will readily appear to those skilled in the art. Therefore, the invention is not limited to the specific details, the representative apparatus, and illustrative examples shown and described. Thus, this application is intended to embrace alterations, modifications, and variations that fall within the scope of the appended claims. Furthermore, the preceding description is not meant to limit the scope of the invention. Rather, the scope of the invention is to be determined by the appended claims and their equivalents.

To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

What is claimed is:

1. A system, comprising:
   a logic configured to perform cryptographic key maintenance for a trusted platform to which the logic is bound in a one-to-one manner, where the cryptographic key maintenance includes migrating a non-migratable storage root key from a root of a key storage hierarchy associated with a trusted platform module associated with the trusted platform; and
   an interface configured to facilitate operably connecting the system to the trusted platform.

2. The system of claim 1, where the cryptographic key maintenance performed by the logic comply with the Trusted Computing Group (TCG) specification version 1.1b.

3. The system of claim 1, where the logic comprises an application specific integrated circuit (ASIC).

4. The system of claim 1, where the logic comprises a microprocessor operably connected to a non-volatile memory.

5. The system of claim 1, where the logic is configured to perform cryptographic key maintenance including cloning the trusted platform with the cooperation of a manufacturer of the trusted platform and an owner of the trusted platform.

6. The system of claim 5, where the logic is configured to perform cryptographic key maintenance including having the manufacturer of the trusted platform act as an intermediary and migrating the non-migratable storage root key from the root of the key storage hierarchy associated with the trusted platform module associated with the trusted platform.

7. The system of claim 1, where the logic is configured to perform cryptographic key migration including logically attaching a trusted platform module migratable key data structure associated with a first protected storage tree to a second protected storage tree.

8. The system of claim 1, where the logic is configured to store one or more of, a copy of a storage root key, a binding data that facilitates binding the logic to the trusted platform in a one-to-one binding, a processor executable set of instructions that facilitate the trusted platform determining that the trusted platform is interfacing with the logic instead of the trusted platform module, and a processor readable set of data that facilitates the trusted platform determining that the trusted platform is interfacing with the logic instead of a trusted platform module.

9. The system of claim 1, where the logic is configured to facilitate substantially instantaneously restoring the trusted platform module.

10. The system of claim 1, where the logic is configured to decrypt one or more of, a key, and a piece of data encrypted by the trusted platform module.

11. The system of claim 1, where the logic is configured to execute processor executable instructions associated with the logic while preventing execution of processor executable instructions not associated with the logic.

12. The system of claim 1, where the logic is configured to read processor readable data associated with the logic while preventing a second logic from reading the processor readable data associated with the logic.

13. The system of claim 1, where the logic is configured to detect whether there is a functional trusted platform module associated with the trusted platform.

14. The system of claim 1, where the logic is configured to prevent creation of a new cryptographic key by the system and to prevent performance of an attestation service by the logic.

15. The system of claim 1, where binding the logic to the trusted platform in a one-to-one manner includes producing an optimal asymmetric encryption padding (OEAP) binary large object to facilitate copying a storage root key stored in a trusted platform module associated with the trusted platform.

16. The system of claim 1, where the logic is configured to perform a finite number of cryptographic key maintenance operations.

17. A system comprising:
a logic configured to perform one or more of, cryptographic key maintenance, and cryptographic key migration for a trusted platform to which the logic is bound in a one-to-one manner; and
an interface configured to facilitate operably connecting the system to the trusted platform;
where the logic and the interface comprise part of a USB token.

18. The system of claim 17, where the logic is configured to migrate one or more non-migratable keys from a trusted platform module associated with the trusted platform and configured to use the migrated one or more non-migratable keys to decrypt items that were encrypted by the trusted platform module.

19. A system, comprising:
an electronic apparatus configured with a trusted platform module; and
an interface operably connected to the electronic apparatus, the interface configured to facilitate operably, detachably connecting a subordinate trusted platform module to the electronic apparatus; and,
a subordinate trusted platform module to communicate with the trusted platform module via the interface, the subordinate trusted platform module including logic to migrate a non-migratable storage root key from the trusted platform module to be stored within the subordinate trusted platform module.

20. The system of claim 19, where the electronic apparatus comprises one of, a computer, a printer, a cellular telephone, and a digital camera.

21. The system of claim 19 where the interface includes a port, and the subordinate trusted platform module is embodied in a removable component that is attachable and detachable to the port.

22. The system of claim 19 where the subordinate trusted platform module is configured to use the migrated non-migratable storage root key to decrypt items that were encrypted by the trusted platform module.

* * * * *

UNITED STATES PATENT AND TRADEMARK OFFICE
CERTIFICATE OF CORRECTION

PATENT NO. : 8,271,783 B2
APPLICATION NO. : 10/827218
DATED : September 18, 2012
INVENTOR(S) : Wael M. Ibrahim et al.

It is certified that error appears in the above-identified patent and that said Letters Patent is hereby corrected as shown below:

In column 17, line 36, in Claim 15, delete "(OEAP)" and insert -- (OAEP) --, therefor.

In column 18, line 22, in Claim 19, delete "and," and insert -- and --, therefor.

Signed and Sealed this
Nineteenth Day of March, 2013

Teresa Stanek Rea
*Acting Director of the United States Patent and Trademark Office*